United States Patent [19]

Head et al.

[11] Patent Number: 4,882,122
[45] Date of Patent: Nov. 21, 1989

[54] METHOD AND APPARATUS FOR OBTAINING A WATER SAMPLE FROM THE CORE OF A BOILING WATER REACTOR

[75] Inventors: Robert A. Head, San Jose; Robert L. Cowan; Robert J. Law, both of Livermore, all of Calif.

[73] Assignee: General Electric Company, San Jose, Calif.

[21] Appl. No.: 154,260

[22] Filed: Feb. 10, 1988

[51] Int. Cl.$^4$ ............................................. G21C 17/00
[52] U.S. Cl. ....................................... 376/245; 376/408
[58] Field of Search ............... 376/245, 408, 256, 250, 376/253; 73/863.81, 863.83, 863.86, 864.81; 250/288, 289, 364

[56] References Cited

U.S. PATENT DOCUMENTS

| | | | |
|---|---|---|---|
| 4,107,533 | 8/1978 | Tabuchi et al. | 376/245 |
| 4,414,858 | 11/1983 | Peterson et al. | 73/863.33 |
| 4,654,187 | 3/1987 | Fejes et al. | 376/245 |
| 4,674,343 | 6/1987 | Larson | 73/863.86 |

*Primary Examiner*—Daniel Wasil
*Attorney, Agent, or Firm*—Robert R. Schroeder

[57] ABSTRACT

In a boiling water reactor, provision is made to sample the core bypass region immediate the top guide to determine the physical and chemical constituents of the moderating water. A conduit for a local power range monitor is fitted with a measurement assembly. The conduit and measurement assembly are inserted up to the vicinity of the top guide. A tube opening is provided to the bypass region immediate the top guide. During reactor operation, the saturated liquid in this region flashes to a steam water mixture (18% steam) at constant enthalpy and is rapidly removed from the reactor to measuring equipment in the reactor building. During removal, the radiolytic disassociated gases (namely hydrogen and oxygen) partition to the steam phase where their recombination is retarded and accurate measurement of their constituent content can be made. Also, temperature of the steam water mixture decreases thereby preserving unstable species like hydrogen peroxide that degrade much more rapidly a high temperatures. In the reactor building, the gases are further cooled, condensed and divided with a first stream being diverted and cooled for detailed chemical analysis and a second stream reheated and pressurized for measurement of electrochemical potential. A substantially real time measurement of the chemical state of the reactor to enable monitoring, measurement, and correction of harmful imbalance is provided.

3 Claims, 3 Drawing Sheets

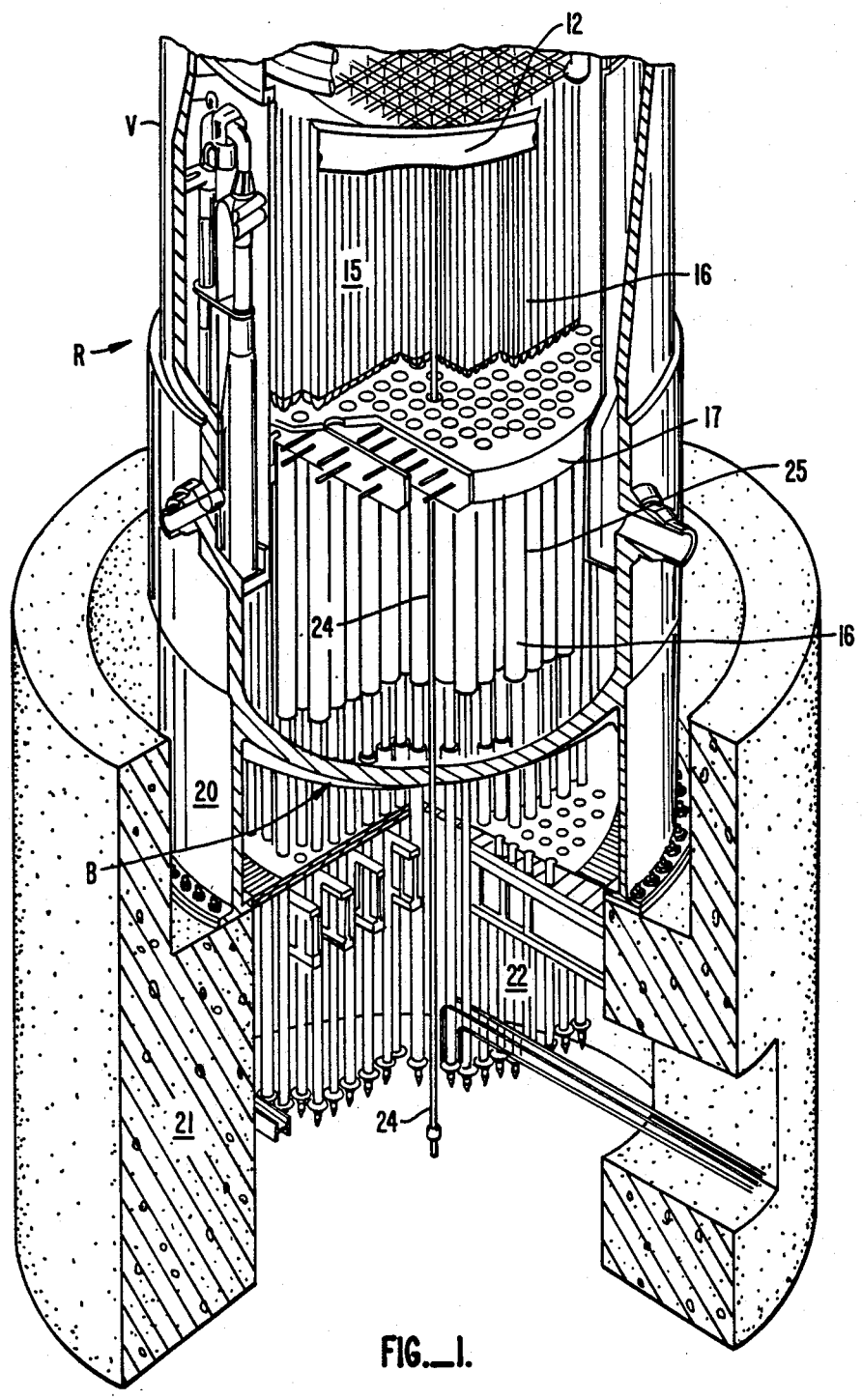
FIG.—1.

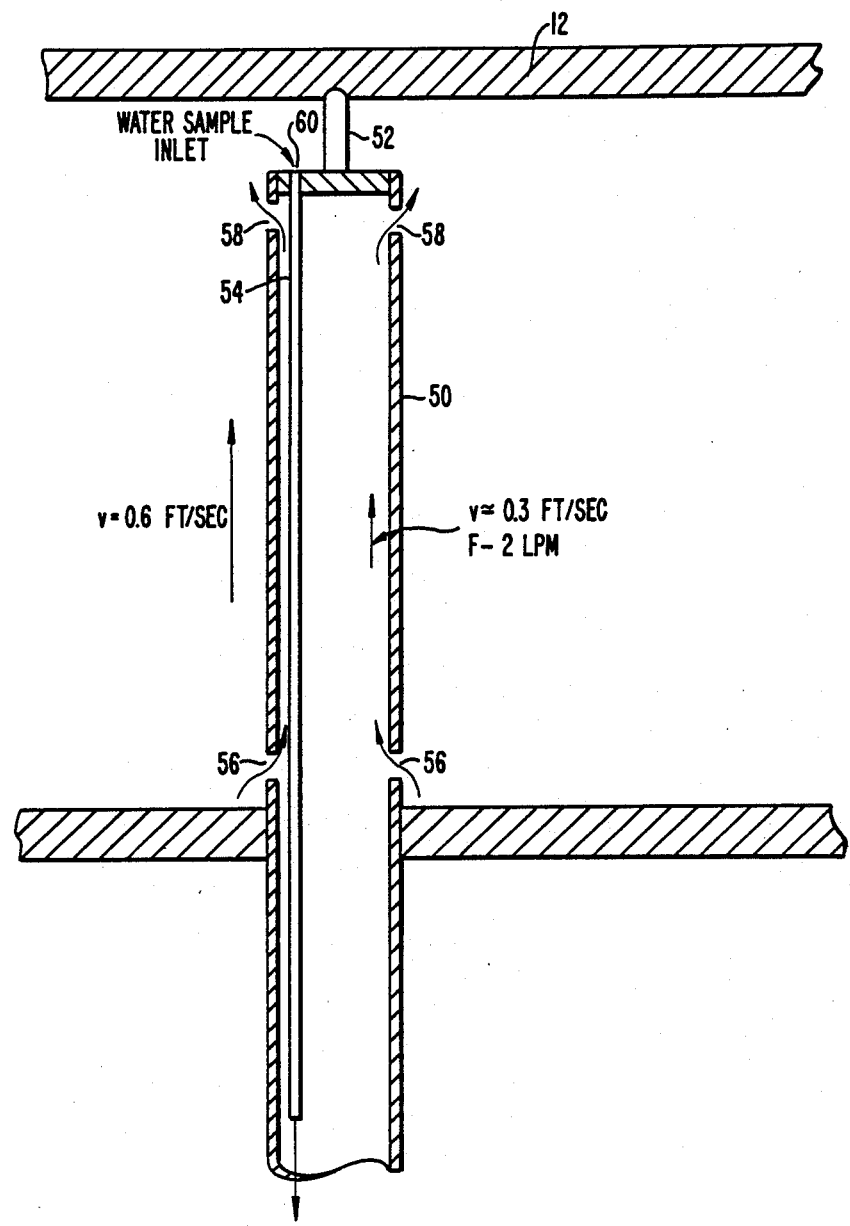
FIG._2.

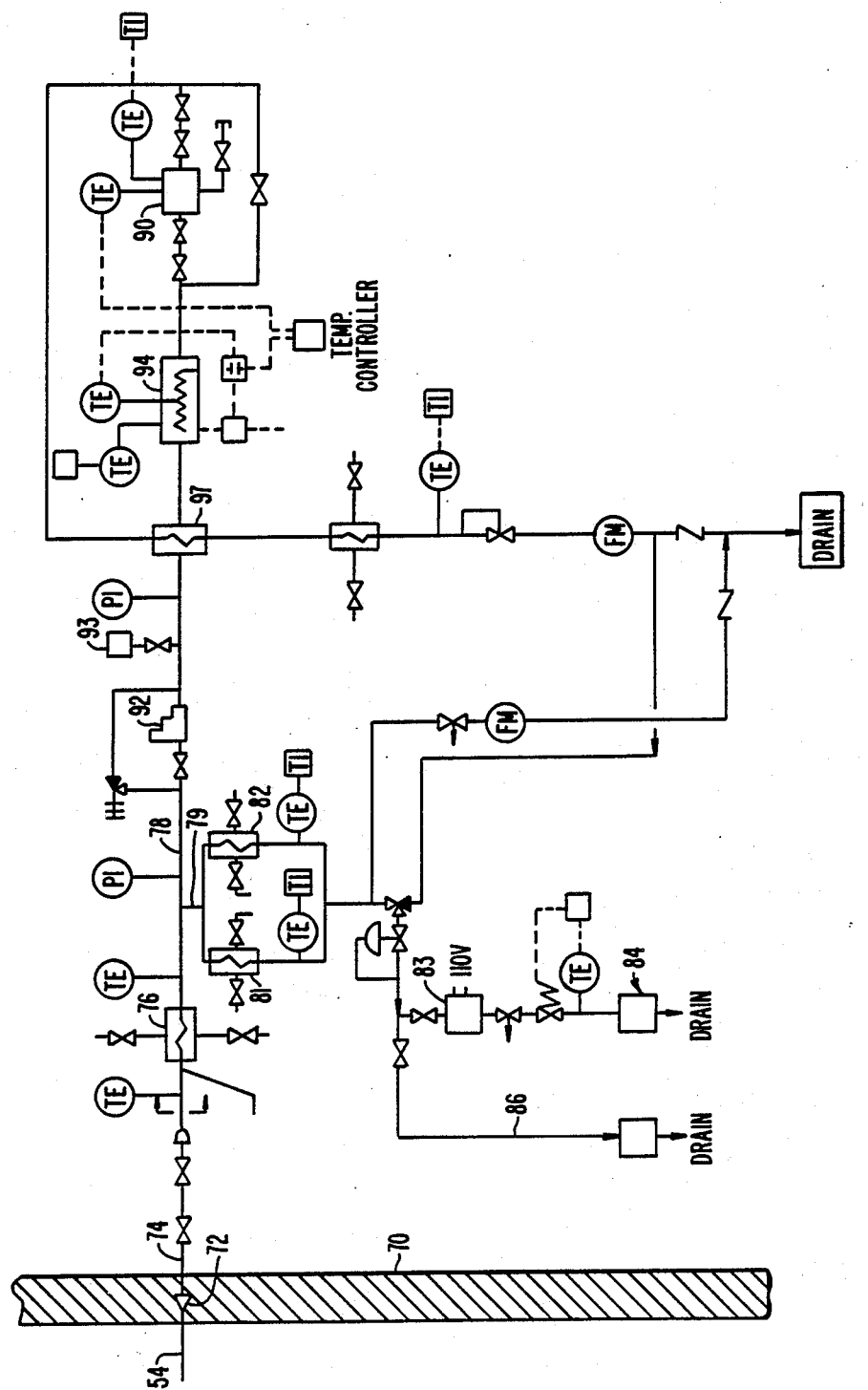
FIG._3.

METHOD AND APPARATUS FOR OBTAINING A WATER SAMPLE FROM THE CORE OF A BOILING WATER REACTOR

BACKGROUND OF THE INVENTION

This invention relates to nuclear reactors, and more specifically, to an apparatus and process for sampling reactor coolant from a region in the highly radioactive core of a boiling water reactor (BWR).

Statement of the Problem

Boiling water reactors are constructed largely from high grade corrosion resistant stainless steels. Nevertheless, over the intended life span of these installations (approximately 40 years), certain materials of construction are exposed to high levels of radiation and to highly oxidizing species formed in the core of the reactor as a result of energy deposited in the reactor coolant. When reactor coolant (high purity water) is exposed to high levels of radiation, the water molecule is decomposed to form hydrated electrons and free radicals of hydrogen and hydroxide. These products in turn combine through various intermediate reactions to form hydrogen, oxygen, and hydrogen peroxide. The presence of these radiolytically produced species, together with other factors, including stress and material properties, can lead to stress corrosion cracking.

A technology referred to as hydrogen water chemistry (HWC) exists for altering the concentration of oxidizing species present in the reactor coolant. By adding excess amounts of hydrogen to the reactor coolant, the oxidizing species (oxygen and hydrogen peroxide) react to reform water, thus altering the oxidizing environment and mitigating the potential for stress corrosion cracking. The ability to mitigate cracking with this technology is dependent on controlling the actual concentrations of hydrogen, oxygen, and hydrogen peroxide present in the reactor coolant. Thus it is very important to have a method for accurately determining these concentrations within the reactor core.

The core of a BWR is divided into two flow regions. The first of these flow regions is through the fuel assemblies, a flow path that is rapid and generate the steam utilized for the production of power by the plant. The second of these flow regions is referred to as the core bypass region. No boiling occurs in this region and the flow is relatively slow, so that the dwell time in the core and hence in the radiation flux is on the order of 10-12 seconds compared to about 1.5 seconds through the fuel assemblies. Due to the extended exposure to radiation, reactor coolant passing through the core bypass region is known to have high concentrations of oxidizing species, and core components in contact with this flow have exhibited cracking. Hence, it is the coolant in the core bypass region that is of specific interest for measurement of hydrogen, oxygen, and hydrogen peroxide to enable control of the hydrogen water chemistry process for mitigation of cracking.

Unfortunately, it is this region of the reactor that constitutes the most hostile region for measurements of any kind. Both the thermal and nuclear radiations make direct measurement in this site not possible, and removal of a sample can make the measurement invalid due to the altering effect of the radiation on the sample as it is removed from the core. Prior to this invention, measurements in this region of the reactor have not been performed.

SUMMARY OF THE INVENTION

In a boiling water reactor for a nuclear power plant, provision is made to sample the core bypass region immediate the top guide to determine the physical and chemical constituents of the moderating water. A conduit for a local power range monitor is fitted with a measurement assembly. The conduit and measurement assembly are inserted up to the vicinity of the top guide. A tube opening is provided to the bypass region immediate the top guide. During reactor operation, the saturated liquid in the core bypass flashes to low quality steam (18%) at constant enthalpy and is rapidly removed from the reactor to measuring equipment in the reactor building, the removal interval being in the range of 4/10th to 7/10ths of a second. During removal, the radiolytically disassociated gases (namely hydrogen and oxygen) are partitioned to the steam phase within the sample tube where their recombination is retarded and accurate measurement of their constituent content can be made. This preservation or "freezing" of the recombination reaction is specifically accomplished by carefully designing the sample tube to cause the sample to flash to steam due to high pressure losses in the tube. Also, as the sample flashes to steam, the temperature decreases, which tends to preserve hydrogen peroxide concentrations which degrade rapidly at higher temperatures.

In the reactor building, the gases are cooled, condensed and divided with a first stream being diverted and cooled for detailed chemical analysis and a second stream reheated and pressurized for measurement of electrochemical potential, another indication of the oxidizing potential of the sample. A substantially real time measurement of the chemical state of the reactor to enable monitoring, measurement, and correction of harmful imbalance is provided.

Other Objects, Features and Advantages

An object of this invention is to disclose a method and apparatus for the rapid evacuation of the saturated water from the vicinity of the top guide in the core bypass region of a boiling water nuclear reactor. Accordingly, the conduit for a local power range monitor has placed therein a small tube. By carefully sizing the tube, the saturated water sample flashes into a steam water mixture. This mixture is immediately evacuated from the core of the reactor in a time interval on the order of 4/10ths to 7/10ths of a second. Once evacuation of the sample has occurred, the fluid stream is condensed and chemical analysis and electrochemical potential is immediately measured.

An advantage of this method of evacuation is that radiolytically disassociated gases—namely hydrogen and oxygen—are partitioned from their dissolved state in the liquid phase into the gaseous or steam phase. When these gases are in the steam phase, their recombination is retarded. Thus, not only is the sample transported but additionally the effects of constituent recombination are mitigated.

A further advantage of this method of sample evacuation is speed. When the saturated water flashes to steam in the sample tube, the specific volume of the sample is greatly increased, thus shortening the residence time in the sample tube to about 4/10th second in the core region. It is very important to keep this time short relative to the 10–12 second dwell time in the core bypass, so that the additional radiation exposure and attendant effects on the sample will be small.

Another advantage of this method is the reduction in temperature that occurs when the sample flashes to steam. As the fraction of sample in the steam phase increases, the temperature of the sample is lowered according to the thermodynamic properties of water. This invention uses the temperature lowering to advantage because certain short-lived species of interest like hydrogen peroxide are more stable at lower temperatures. Thus, the possibility of accurately measuring these species is greatly increased.

Yet another object of this invention is to disclose a protocol for the testing of the evacuated fluid to provide an online real time indication of water state interior of the reactor. Accordingly, the superheated steam is condensed but divided into two streams. In a first stream water chemistry tests are run. In a second stream original pressure is restored heating above 500° F. occurs and electrochemical potential is measured. Provision is made for draining of the small sample to the reactor water cleanup or the radioactive waste system of the operating nuclear power plant.

BRIEF DESCRIPTION OF THE DRAWINGS

Other objects, features, and advantages of this invention will be more apparent after referring to the specification in which:

FIG. 1 is a schematic of the bottom portion of a reactor illustrating a local power range monitor tube inserted up to and towards the vicinity of the top guide;

FIG. 2 is a schematic of the local power range monitor tube at the vicinity of the top guide illustrating the water sample inlet utilized for flashing and evacuation of steam; and FIG. 3 is a flow diagram interior of a reactor building illustrating the apparatus for testing the evacuated sample.

Referring to FIG. 1, a portion of a reactor R is illustrated. A shield wall 21 supports a reactor vessel B through a support skirt 20. Reactor vessel V has a bottom B through which control rods 16 are driven by control rod drives 22. A local incore flux monitor conduit 24 is shown extending through the bottom B of the reactor vessel V upwardly through the control rod plenum 25 and to the vicinity of the top guide 12.

Lower power range monitors have housings. These housings are the vehicle for the insertion of the local power range monitors. While the drawing in this application has only shown schematically one such housing, the reader will understand that many such housings are commonly used. Moreover, the available spaces for the insertion of these monitors are many.

This invention utilizes a local power range monitor location for the insertion of the disclosed sample apparatus.

It will be understood that between core plate 17 and top guide 12 there resides fuel assemblies 15. These fuel assemblies define two areas through which fluid flow may occur.

The first area is interior and through the fuel assemblies. In such flow, the moderating water is generated into steam. The steam passes upwardly through a steam separator and steam dryer (not shown).

Secondly, water also passes in between the fuel assemblies in the core bypass region. This water passes in the area in which the control rod 16 makes excursion to control the nuclear reactor. This same volume is penetrated by the local power range monitors.

As heretofore explained, this fluid flow area is an extreme slow flow area. Accordingly, radiolytically produced species in the reactor water are at maximum concentration immediate the top guide 12. A brief discussion of these species can be helpful.

First, and foremost, it will be remembered that the entirety of the reactor is built of corrosion resistant metal especially stainless steel. Therefore, the presence of oxygen in a temperature elevated environment such as that found interior of the reactor is at all times to be avoided.

The core is highly radioactive. The radioactivity through radiolysis disassociates oxygen and hydrogen from water. Such disassociation produces oxidizing species in addition to the oxygen.

These oxidizing species in addition to causing general corrosion assists metallic cracking. Metallic cracking is of two types. In one type of cracking known as intergranular stress corrosion cracking, previously thermal cycled metal—such as welded parts placed into the reactor—are subjected to an oxidizing environment. As they are subjected to an oxidizing environment, cracking occurs along zones of stress concentration.

Another type of cracking is known as irradiation assisted stress corrosion cracking. In this type of cracking, metal given a total quantum of radiation undergoes cracking when exposed to an oxidizing environment.

In either event by being able to monitor the amount of oxygen and other oxidizing species present, both types of cracking can be retarded or avoided altogether.

It should also be noted that in nuclear power plants various organic compounds are utilized in many different applications within the plant. Unfortunately, these organic compounds can break down in the presence of radioactivity if they enter into the core of the reactor. When these organic compounds break down, they form highly conductive compounds. Such organic compounds can include trichloroethane, ethylene glycol and other organics. In the core of the reactor, the broken down constituents of these chemicals give large conductivity transients. This elevates the reactor water conductivity and in many cases the electrochemical potential and can lead to both types of corrosion cracking.

It has been found that the species present in the water are not necessarily stable. For example, the disassociated oxygen and hydrogen can chemically recombine and in such recombination lose their identities. In other words, the impurities can avoid methods of detection due to recombination.

Having set forth the environment, and the problem to be solved, the solution is schematically illustrated with respect to FIG. 2. The analytic piping adjacent the reactor in the reactor building is illustrated with respect to FIG. 3.

Referring to FIG. 2 an inserted local power range monitor conduit 50 is illustrated. Conduit 50 contacts top guide 12 at a finger 52.

The inserted local power range monitor conduit 50 includes an attached ¼-inch tube 54. Tube 54 open to the reactor water immediate the outside of the local power range monitor.

The core bypass flow region has, among other purposes, the maintenance of a significant water content in order that the power range monitors may be relatively cool and function. Accordingly, coolant inflow occurs in tube 54 at apertures 56 and coolant outflow occurs at apertures 58. While it is desired that flow rate internally of the local power range monitor conduit 50 equal external flow rate, the flow rates vary with external flow rate being 6/10th of a foot per second and internal flow rate being 3/10th of a foot per second.

Sample inlet occurs at 60. The saturated water undergoes rapid flashing to a steam water mixture (18% quality). Pressure is reduced from a 1,000 psi to the order of 165 psi and the temperature decreases from 540° F. to about 430° F. Evacuation of the water sample occurs in the range of 4/10th to 7/10th of a second.

Escape of the steam occurs along conduit 54. Referring to FIG. 3, a wall 70 of the reactor building is schematically illustrated. A ¼-inch line 54 at a union 72 expands to a ¾-inch line 74, and then reduces back to a ¼-inch line size downstream of isolation valves. A heat exchanger 76 extracts and immediately condenses the steam and cools the water. The water is then split between a first flow path 78 for electrochemical potential measurement and a second flow path 79 for chemical analysis. Temperature of 340° F. and pressure of 165 psi is utilized.

Sizing of the conduit for outflow from the reactor core by-pass region is important. Specifically, we use tubing having an exterior diameter of ¼ inch with inside diameter in the range of 0.156 to 0.192 inches. The tube extends 40 feet within the reactor and approximately 80 feet from the reactor to the point of analysis for a total extension of 120 feet.

Simply stated, the pipe is sized small enough to have an inside diameter to permit sufficient pressure drop so that the water immediately flashes to steam. This gives the molecular separation and the cooling of the molecules of the sample to reduce the temperature of the water. This in turn reduces the tendency of the chemically disassociated elements to recombine.

At the same time, this sizing of the pipe gives the requisite evacuation of the sample. The specific volume of the sample swells causing rapid evacuation. Dwell time is reduced so that no appreciable further irradiation of the sample occurs. In other words, the conduit is sized to maintain the sample unchanged.

Paired heat exchangers 81, 82 reduce the temperature of the water to a 100° F. Thereafter, water is routed through a second cooler 83 and analyzed for water chemistry at chemical analysis unit 84. This chemical analysis unit includes dissolved gas analyzers analyzing for oxygen and hydrogen, testing for the conductivity, and pH analysis. Alternate path 86 contains apparatus for analyzing the presence of hydrogen peroxide and an ion chromatograph for locating organic acids, transition metals, anions, and monovalent and divalent cations.

Electrochemical measurement occurs in an autoclave 90. For this measurement, water must be repressurized to approximately the 1,000 lbs. per square inch pressure in the reactor. Thus, a positive displacement diaphragm pump 92 creates 1000 psi, while a damper 93 maintains the pressure without substantial variation. A heat exchanger 97 and electric heater 94 raise the temperature of the water to approximately 500° F. It has been determined that this temperature is required for an accurate ECP measurement. Measurement occurs across reference and working electrodes as is standard in the art within autoclave 90. Thereafter, the sample is cycled through a regenerative heat exchanger 97. The regenerative heat exchanger liberates much of the heat necessary for the measurement into the stream inflowing to the autoclave for test. Energy is conserved. Finally, the sample is discharged to drain.

Regarding the drainage herein utilized, the sample is discharged either to the reactor water clean-up system or alternatively to the radioactive waste treatment system of the plant. In either event, the water is recycled to the reactor.

What is claimed is:

1. An apparatus for evacuating water for analysis from the core bypass region of a boiling water nuclear reactor in the vicinity of the top guide overlying said core comprising in combination: an inserted local power range monitor conduit penetrating said core bypass region; an open tube placed within said conduit, said tube exposed adjacent the top guide of said reactor for receiving water sample;

said tube having a second end remote from said reactor for supplying said water sample for analysis;

valve means for selectively opening said tube whereby water adjacent said top guide flashes to steam of high specific volume to pass through said tube at high velocity;

means for condensing said steam at said remote end of said tube whereby rapid evacuation of said sample occurs.

2. The apparatus of claim 1 and wherein said valve means is adjacent the remote end of said tube.

3. A process for the evacuation of water sample from a boiling water reactor in the core bypass region at the vicinity of the top guide, said process comprising the steps of:

providing a tube having a first end for insertion to the vicinity of the top guide in the core bypass region of said nuclear reactor and have a second end at a location remote from said reactor;

inserting said first end of said tube in a local power range monitor conduit in the core bypass region with the open end of said tube exposed to nearly saturated water adjacent the top guide;

reducing the pressure in said tube from the second end of said tube whereby the water adjacent the open end of said tube flashes to a steam water mixture of high specific volume and rapidly passes through said tube; and, condensing said steam at said remote end for analyzing the contents of said water.

* * * * *